United States Patent
Obert et al.

(10) Patent No.: US 10,774,466 B2
(45) Date of Patent: Sep. 15, 2020

(54) SIZING COMPOSITION BASED ON A NON-REDUCING SACCHARIDE AND A HYDROGENATED SACCHARIDE, AND INSULATING PRODUCTS OBTAINED

(71) Applicant: SAINT-GOBAIN ISOVER, Courbevoie (FR)

(72) Inventors: Edouard Obert, Fleurines (FR); Lionel Kiefer, Paris (FR); Benjamin Kaplan, Aachen (DE)

(73) Assignee: SAINT-GOBAIN ISOVER, Courbevoie (FR)

( * ) Notice: Subject to any disclaimer, the term of this patent is extended or adjusted under 35 U.S.C. 154(b) by 428 days.

(21) Appl. No.: 15/304,722

(22) PCT Filed: Apr. 14, 2015

(86) PCT No.: PCT/FR2015/050994
§ 371 (c)(1),
(2) Date: Oct. 17, 2016

(87) PCT Pub. No.: WO2015/159012
PCT Pub. Date: Oct. 22, 2015

(65) Prior Publication Data
US 2017/0036955 A1 Feb. 9, 2017

(30) Foreign Application Priority Data

Apr. 15, 2014 (FR) ..................................... 14 53350

(51) Int. Cl.
| | |
|---|---|
| *C03C 25/25* | (2018.01) |
| *D06M 13/207* | (2006.01) |
| *C08J 5/04* | (2006.01) |
| *C03C 25/32* | (2018.01) |
| *C03C 25/321* | (2018.01) |
| *C09J 103/02* | (2006.01) |
| *D06M 13/165* | (2006.01) |

(52) U.S. Cl.
CPC ........... *D06M 13/207* (2013.01); *C03C 25/25* (2018.01); *C03C 25/32* (2013.01); *C03C 25/321* (2013.01); *C08J 5/043* (2013.01); *C08J 5/044* (2013.01); *C09J 103/02* (2013.01); *D06M 13/165* (2013.01)

(58) Field of Classification Search
CPC ........ C03C 25/25; C03C 25/32; C03C 25/321
USPC .............. 252/62; 525/50, 54.2, 54.21, 54.24, 525/54.31; 428/411.1; 442/172, 180
See application file for complete search history.

(56) References Cited

U.S. PATENT DOCUMENTS

| | | | |
|---|---|---|---|
| 5,318,990 A | 6/1994 | Strauss | |
| 5,340,868 A | 8/1994 | Strauss et al. | |
| 5,661,213 A | 8/1997 | Arkens et al. | |
| 5,895,804 A | 4/1999 | Lee et al. | |
| 5,919,528 A * | 7/1999 | Huijs | C03C 25/34 206/524.1 |
| 5,932,689 A | 8/1999 | Arkens et al. | |
| 5,977,232 A | 11/1999 | Arkens et al. | |
| 6,071,994 A | 6/2000 | Hummerich et al. | |
| 6,099,773 A | 8/2000 | Reck et al. | |
| 6,146,746 A | 11/2000 | Reck et al. | |
| 6,299,936 B1 | 10/2001 | Reck et al. | |
| 6,331,350 B1 | 12/2001 | Taylor et al. | |
| 8,623,234 B2 * | 1/2014 | Jaffrennou | C03C 25/321 252/62 |
| 8,974,686 B2 * | 3/2015 | Jaffrennou | C03C 25/321 252/62 |
| 2002/0091185 A1 | 7/2002 | Taylor et al. | |
| 2002/0188055 A1 | 12/2002 | Chen et al. | |
| 2003/0008978 A1 | 1/2003 | Chen et al. | |
| 2004/0002567 A1 | 1/2004 | Chen et al. | |
| 2005/0215153 A1 | 9/2005 | Cossement et al. | |
| 2012/0070645 A1 * | 3/2012 | Jaffrennou | C08L 83/00 428/221 |
| 2012/0133073 A1 * | 5/2012 | Pacorel | C08F 8/14 264/128 |
| 2012/0263934 A1 | 10/2012 | Jaffrennou et al. | |
| 2013/0032749 A1 * | 2/2013 | Jaffrennou | C03C 25/321 252/62 |
| 2015/0203399 A1 * | 7/2015 | Didier | C03C 25/26 428/426 |

FOREIGN PATENT DOCUMENTS

| | | |
|---|---|---|
| CN | 103110039 A | 5/2013 |
| FR | 1 066 176 A | 6/1954 |
| WO | WO 2006/120523 A1 | 11/2006 |
| WO | WO 2008/043960 A1 | 4/2008 |
| WO | WO 2008/053332 A1 | 5/2008 |
| WO | WO 2009/080938 A2 | 7/2009 |
| WO | WO 2010/029266 A1 | 3/2010 |
| WO | WO 2011/015946 A2 | 2/2011 |
| WO | WO 2012/168621 A1 | 12/2012 |
| WO | WO 2013/014399 A1 | 1/2013 |
| WO | WO 2013/021112 A1 | 2/2013 |

OTHER PUBLICATIONS

International Search Report as issued in International Patent Application No. PCT/FR2015/050994, dated Jul. 16, 2015.

* cited by examiner

*Primary Examiner* — Matthew D Matzek

(74) *Attorney, Agent, or Firm* — Pillsbury Winthrop Shaw Pittman LLP

(57) ABSTRACT

A sizing composition, in particular for insulating products based on mineral wool, in particular of glass or of rock, includes at least one non-reducing saccharide, at least one hydrogenated saccharide, and at least one polycarboxylic organic acid.

41 Claims, No Drawings

SIZING COMPOSITION BASED ON A NON-REDUCING SACCHARIDE AND A HYDROGENATED SACCHARIDE, AND INSULATING PRODUCTS OBTAINED

CROSS-REFERENCE TO RELATED APPLICATIONS

This application is the U.S. National Stage of International Application Ser. No. PCT/FR2015/050994, filed Apr. 14, 2015, which in turn claims priority to French Application No. 1453350, filed Apr. 15, 2014. The contents of all of these applications are incorporated herein by reference in their entirety.

The present invention relates to the field of sizes for composite or coated products, such as thermal and/or acoustic insulating products based on mineral wool, in particular of glass or of rock, and on a formaldehyde-free organic binder.

The invention relates more particularly to a sizing composition capable of crosslinking to form said organic binder, which contains a non-reducing saccharide, a hydrogenated saccharide and a polycarboxylic organic acid.

A subject of the invention is also the insulating products consisting of mineral wool sized by means of the abovementioned sizing composition.

The manufacture of insulating products based on mineral wool generally comprises a step of manufacture of the wool itself, which can be carried out by various processes, for example according to the known technique of fiberizing by internal or external centrifugation.

Internal centrifugation consists in introducing the molten mineral material (glass or rock) into a centrifugal device comprising a multitude of small orifices, the material being projected toward the peripheral wall of the device under the action of the centrifugal force and escaping therefrom in the form of filaments. On leaving the centrifugal device, the filaments are drawn and carried toward a receiving member by a gas stream having a high temperature and a high speed, in order to form therein a web of fibers (or mineral wool).

External centrifugation consists, for its part, in pouring the molten material at the external peripheral surface of rotating members, known as rotors, from where the molten material is ejected under the action of the centrifugal force. Means for drawing by gas stream and for collecting on a receiving member are also provided.

In order to provide for the assembly of the fibers together and to make it possible for the web to have cohesion, a sizing composition containing a thermosetting resin is projected onto the fibers, on the path between the outlet of the centrifugal device and the receiving member. The web of fibers coated with the size is subjected to a heat treatment, at a temperature generally of greater than 100° C., in order to bring about the polycondensation of the resin and to thus obtain a thermal and/or acoustic insulating product having specific properties, in particular dimensional stability, tensile strength, thickness recovery after compression and homogeneous color.

The sizing composition to be projected onto the mineral wool is generally in the form of an aqueous solution containing the thermosetting resin and additives, such as a catalyst for the crosslinking of the resin, an adhesion-promoting silane, a dust-preventing mineral oil, etc. The sizing composition is most commonly applied to the fibers by spraying.

The properties of the sizing composition depend largely on the characteristics of the resin. From the viewpoint of the application, it is necessary for the sizing composition to exhibit good sprayability and to be able to be deposited at the surface of the fibers in order to efficiently bind them.

The resin must be stable for a given period of time before being used to form the sizing composition, which composition is generally prepared at the time of use by mixing the resin and the additives previously mentioned.

From the regulatory point of view, it is necessary for the resin to be regarded as non-polluting, i.e. for it to contain—and for it to generate during the sizing step or subsequently—as little as possible in the way of compounds which may be harmful to human health or to the environment.

The thermosetting resins most commonly used are phenolic resins belonging to the resol family. In addition to their good crosslinkability under the abovementioned thermal conditions, these resins are soluble in water, have a good affinity for mineral fibers, in particular glass fibers, and are relatively inexpensive.

The most common resols are obtained by condensation of phenol and formaldehyde, in the presence of a basic catalyst. In the end, these resols contain a certain proportion of unreacted monomers, in particular formaldehyde, the presence of which is undesirable because of its known harmful effects.

For this reason, resol-based resins are generally treated with urea, which reacts with the free formaldehyde by trapping it in the form of nonvolatile urea-formaldehyde condensates. The presence of urea in the resin in addition brings a certain economic advantage as a result of its low cost, because it is possible to introduce it in a relatively large amount without affecting the operating qualities of the resin, in particular without harming the mechanical properties of the final product, thereby significantly lowering the total cost of the resin.

It has nevertheless been observed that, under the temperature conditions to which the web is subjected in order to obtain crosslinking of the resin, the urea-formaldehyde condensates are not stable; they decompose with restoration of the formaldehyde and urea, which is in turn at least partially decomposed to ammonia, which are released into the atmosphere of the factory.

Regulations with regard to environmental protection, which are becoming more restrictive, are forcing manufacturers of insulating products to seek solutions which make it possible to further lower the levels of undesirable emissions, in particular of formaldehyde.

Solutions in which resols are replaced in sizing compositions are known and are based on the use of a carboxylic acid and of an alcohol.

In U.S. Pat. No. 5,340,868, the size comprises a polycarboxylic polymer, a β-hydroxylamide and an at least trifunctional monomeric carboxylic acid.

Sizing compositions have also been described which comprise an alkanolamine containing at least two hydroxyl groups and a polycarboxylic polymer (U.S. Pat. Nos. 6,071994, 6,099,773, 6,146,746) which can be combined with a copolymer (U.S. Pat. No. 6,299,936).

Sizing compositions comprising a polycarboxylic polymer and a polyol have also been provided (US 2002/0091185, US 2002/0091185). These compositions can also contain a catalyst which can be a phosphorus-containing compound (U.S. Pat. Nos. 5,318,990, 5,661,213, 6,331,350, US2003/0008978), a fluoroborate (U.S. Pat. No. 5,977,232) or else a cyanamide, a dicyanamide or a cyanoguanidine (U.S. Pat. No. 5,932,689), or a cationic, amphoteric or nonionic surfactant (US 2002/0188055), or else a coupling agent of silane type (US 2004/0002567).

WO 2006/120523 describes a sizing composition which comprises (a) a poly(vinyl alcohol), (b) a multifunctional crosslinking agent chosen from nonpolymeric polyacids or salts thereof, anhydrides or a nonpolymeric polyaldehyde and (c) optionally a catalyst, the (a)/(b) ratio by weight ranging from 95:5 to 35:65 and the pH being at least equal to 1.25.

There is also known, from WO 2008/053332, a sizing composition which comprises an adduct (a) of a sugar polymer and (b) of a multifunctional crosslinking agent chosen from monomeric polyacids or salts thereof, and anhydrides, which is obtained under conditions such that the (a)/(b) ratio by weight ranges from 95:5 to 35:65.

Moreover, sizing compositions for which all or a portion of the alcohol is replaced with one or more saccharides have been described.

In US 2005/0215153, the sizing composition is formed from a prebinder containing a polymer of carboxylic acid and of a polyol, and from a dextrin as cobinder.

In U.S. Pat. No. 5,895,804, the sizing composition comprises a polycarboxylic polymer with a molecular weight at least equal to 1000 and a polysaccharide with a molecular weight at least equal to 10,000.

In WO 2009/080938, the sizing composition comprises at least one polycarboxylic organic acid with a molar mass of less than or equal to 1000 and at least one monosaccharide and/or polysaccharide.

Finally, a sizing composition which comprises at least one hydrogenated sugar and a polyfunctional crosslinking agent is known from WO2010/029266, WO 2013/014399 and WO 2013/021112.

It has been noted that insulating products based on mineral wool manufactured with the abovementioned sizing compositions exhibit a resistance to aging in a humid environment that is insufficient to allow them to be used on the outside of buildings.

The objective of the present invention is to provide a saccharide-based aqueous sizing composition which confers on composite or coated products, in particular on insulating products based on mineral wool, an improved hydrolytic resistance, while retaining good mechanical properties.

More specifically, the aqueous sizing composition in accordance with the invention is characterized in that it comprises
at least one non-reducing saccharide,
at least one hydrogenated saccharide, and
at least one polycarboxylic organic acid.

The term "non-reducing saccharide" should be understood in the conventional sense, namely that it denotes a saccharide consisting of several saccharide units of which the carbon 1 carrying the hemiacetal OH group is involved in a bond. For the purposes of the invention, a non-reducing saccharide exhibits no reducing action on alkaline copper solutions.

The non-reducing saccharide in accordance with the present invention is a non-reducing oligosaccharide containing at most 10 saccharide units.

By way of examples of such non-reducing saccharides, mention may be made of disaccharides, such as trehalose, isotrehaloses, sucrose and isosucroses; trisaccharides, such as melezitose, gentianose, raffinose, erlose and umbelliferose; tetrasaccharides, such as stachyose; and pentasaccharides, such as verbascose.

Preference is given to sucrose and trehalose, and even better still sucrose.

The term "hydrogenated saccharide" is intended to mean all of the products resulting from the reduction, in whatever way, of a saccharide chosen from monosaccharides, oligosaccharides, or polysaccharides, which can be linear, branched or cyclic, and mixtures of these products, in particular starch hydrolysates.

The saccharide can be hydrogenated by the known methods operating under high hydrogen pressure and temperature conditions, in the presence of a catalyst chosen from Groups IB, IIB, IVB, VI, VII and VIII of the Periodic Table of Elements, preferably from the group comprising nickel, platinum, palladium, cobalt, molybdenum and mixtures thereof. The preferred catalyst is Raney nickel. The hydrogenation converts the saccharide or the mixture of saccharides (for example, a starch hydrolysate) into the corresponding polyols.

Although not being preferred, the hydrogenation can be carried out in the absence of hydrogenation catalyst, in the presence of a source of hydrogen other than hydrogen gas, for example an alkali metal borohydride, such as sodium borohydride.

By way of examples of hydrogenated saccharides, mention may be made of erythritol, arabitol, xylitol, sorbitol, mannitol, iditol, maltitol, isomaltitol, lactitol, cellobitol, palatinitol, maltotritol and the hydrogenation products of starch hydrolysates, in particular said by the company Tereos Syral under the name Maltilite®. Preferably, use is made of the hydrogenation products of starch hydrolysates, advantageously a maltitol syrup.

The hydrogenated saccharide in accordance with the invention has a number-average molar mass of less than 100,000, preferably less than 50 000, advantageously less than 5000, more particularly less than 1000, and even better still greater than 100.

In the sizing composition, the hydrogenated saccharide(s) preferably represent(s) from 18% to 80% of the total weight of non-reducing saccharide(s) and hydrogenated saccharide(s), advantageously from 30% to 70% and even better still from 40% to 60%.

The polycarboxylic organic acid in accordance with the invention is capable of reacting with the hydroxyl groups of the non-reducing saccharide and of the hydrogenated saccharide under the effect of heat so as to form ester bonds which result in a polymeric network being obtained in the final binder. Said polymeric network makes it possible to establish bonds at the junctions of the fibers in the mineral wool. The inventors think that dehydration reactions also occur on the non-reducing saccharide, inducing the formation of furan polymers which integrate into the network of the binder and in this way contribute to improving its hydrolytic resistance.

The term "polycarboxylic organic acid" is intended to mean an organic acid comprising at least two carboxylic functions, preferably at most 15, and advantageously two to four carboxylic functions.

The polycarboxylic organic acid generally has a number-average molar mass of less than or equal to 1000, preferably less than or equal to 750 and advantageously less than or equal to 500.

The polycarboxylic organic acid is a saturated or unsaturated and straight or branched acyclic acid, a cyclic acid or an aromatic acid.

The polycarboxylic organic acid can be a dicarboxylic acid, for example oxalic acid, malonic acid, succinic acid, glutaric acid, adipic acid, pimelic acid, suberic acid, azelaic acid, sebacic acid, malic acid, tartaric acid, tartronic acid, aspartic acid, glutamic acid, fumaric acid, itaconic acid, maleic acid, traumatic acid, camphoric acid, phthalic acid and its derivatives, in particular containing at least one boron or chlorine atom, tetrahydrophthalic acid and its derivatives, in particular containing at least one chlorine atom, such as chlorendic acid, isophthalic acid, terephthalic acid, mesaconic acid and citraconic acid; a tricarboxylic acid, for example citric acid, tricarballylic acid, 1,2,4-butanetricarboxylic acid, aconitic acid, hemimellitic acid, trimellitic acid and trimesic acid; or a tetracarboxylic acid, for example 1,2,3,4-butanetetracarboxylic acid and pyromellitic acid.

Particularly advantageously, the polycarboxylic organic acid contains two to four carboxylic functions.

The preferred polycarboxylic organic acid is citric acid.

In the sizing composition, the non-reducing saccharide(s) and the hydrogenated saccharide(s) represent from 10% to 90% of the weight of the mixture consisting of the non-reducing saccharide(s), the hydrogenated saccharide(s) and the polycarboxylic organic acid(s), preferably from 20% to 85%, advantageously from 30% to 80%, even better still from 40% to 65% and particularly advantageously from 45% to 65%.

Generally, the sizing composition according to the invention does not contain monoalkylamine, dialkylamine and alkanolamine. It is not in fact desirable for these compounds (which are capable of reacting with the other constituents of the sizing composition) to be incorporated into the polymeric network of the final binder.

The sizing composition may also comprise an acidic or basic catalyst, which has in particular the function of adjusting the crosslinking start temperature.

The catalyst can be chosen from Lewis bases and acids, such as clays, colloidal or noncolloidal silica, organic amines, quaternary amines, metal oxides, metal sulfates, metal chlorides, urea sulfates, urea chlorides and silicate-based catalysts.

The catalyst can also be a phosphorus-containing compound, for example an alkali metal hypophosphite salt, an alkali metal phosphite, an alkali metal polyphosphate, an alkali metal hydrogen phosphate, a phosphoric acid or an alkylphosphonic acid. Preferably, the alkali metal is sodium or potassium.

The catalyst may also be a compound containing fluorine and boron, for example tetrafluoroboric acid or a salt of this acid, in particular an alkali metal tetrafluoroborate, such as sodium tetrafluoroborate or potassium tetrafluoroborate, an alkaline-earth metal tetrafluoroborate, such as calcium tetrafluoroborate or magnesium tetrafluoroborate, a zinc tetrafluoroborate and an ammonium tetrafluoroborate.

Preferably, the catalyst is sodium hypophosphite, sodium phosphite and mixtures of these compounds.

The amount of catalyst introduced into the sizing composition can represent up to 20% of the total weight of the non-reducing saccharide(s), of the hydrogenated saccharide(s) and of polycarboxylic organic acid(s), preferably up to 10%, and advantageously is at least equal to 1%.

The sizing compositions that are particularly preferred contain sucrose, maltitol and citric acid and, where appropriate, a crosslinking catalyst, in particular sodium hypophosphite.

The sizing composition in accordance with the invention can also comprise the conventional additives below in the following proportions calculated on the basis of 100 parts by weight of non-reducing saccharide(s), of hydrogenated saccharide(s) and of polycarboxylic organic acid(s):

0 to 2 parts of silane, in particular an amino silane or an epoxy silane, 0 to 40 parts of oil, preferably 0 to 30 parts, in particular 4 to 24 parts, 0 to 30 parts of urea, preferably 0 to 20 parts, and advantageously 0 part, 0 to 5 parts of a silicone, 0 to 20 parts of a polyol other than the above mentioned saccharides, 0 to 15 parts of metal sulfate or ammonium sulfate, preferably 0 to 10 parts and advantageously 0 to 5 parts, 0 to 30 parts of an "extender" chosen from lignin derivatives, such as ammonium lignosulfonate (ALS) or sodium lignosulfonate, and animal or plant proteins.

The role of additives is known and briefly recalled: the silane is an agent for coupling between the fibers and the binder, and also acts as an antiaging agent; the oils are dust-preventing and hydrophobic agents; the urea and the polyol act as plasticizers and make it possible to prevent pregelling of the sizing composition; the silicone is a hydrophobic agent which has the function of reducing water absorption by the insulating product; the metal sulfate or ammonium sulfate makes it possible to improve the mechanical properties of the final product, in particular the tensile strength after aging; the "extender" is an organic filler which is soluble or dispersible in the aqueous sizing composition and which makes it possible in particular to reduce the cost thereof.

The polyol added as additive is necessarily different than the non-reducing saccharide and than the hydrogenated saccharide. This polyol may in particular be glycerol, a glycol such as ethylene glycol, propylene glycol, butylene glycol and poly(alkylene) glycols based on these glycols, or vinyl alcohol homopolymers and copolymers.

The metal sulfate added as additive is a sulfate of an alkali metal or alkaline-earth metal, of a transition metal or of a poor metal, preferably a sodium sulfate, magnesium sulfate, iron sulfate, cobalt sulfate, nickel sulfate, copper sulfate, zinc sulfate or aluminum sulfate, and advantageously copper sulfate, iron$^{II}$ sulfate or aluminum sulfate. By way of example of ammonium sulfate, mention may be made of ammonium hydrogen sulfate ($NH_4HSO_4$) and ammonium sulfate ($(NH_4)_2SO_4$).

The sizing composition has an acidic pH, of about from 1 to 5 depending on the type of polycarboxylic organic acid used, preferably greater than or equal to 1.0. Advantageously, the pH is maintained at a value at least equal to 1.5 so as to limit the problems of instability of the sizing composition and of corrosion of the manufacturing line, through the addition of an amine compound which is not capable of reacting with the non-reducing saccharide and the hydrogenated saccharide, for example a tertiary amine, in particular triethanolamine. The amount of amine compound can represent up to 30 parts by weight of the total weight of non-reducing saccharide(s), of hydrogenated saccharide(s) and of polycarboxylic organic acid(s).

The sizing composition is intended in particular to be applied to mineral fibers, in particular glass or rock fibers.

Conventionally, the sizing composition is projected onto the mineral fibers at the outlet of the centrifugal device and before they are collected on the receiving member in the form of a web of fibers which is subsequently treated at a temperature which enables the crosslinking of the size and the formation of an infusible binder. The crosslinking of the size according to the invention is carried out at a temperature comparable to that of a conventional formaldehyde-phenol resin, at a temperature greater than or equal to 110° C., preferably greater than or equal to 130° C., and advantageously greater than or equal to 140° C.

The acoustic and/or thermal insulating products obtained from these sized fibers also constitute a subject of the present invention.

These products are generally in the form of a mat or felt of mineral wool, of glass or of rock, or else a net of mineral fibers, also of glass or of rock, intended in particular to form a surface coating of said mat or of said felt.

The examples which follow make it possible to illustrate the invention without, however, limiting it.

In these examples, the following are measured:
the tensile strength according to standard ASTM C 686-71T on a sample cut-out by stamping from the insulating product. The sample has the shape of a torus with a length of 122 mm, a width of 46 mm, a radius of curvature of the cut-out of the outer edge equal to 38 mm and a radius of curvature of the cut-out of the inner edge equal to 12.5 mm.

The sample is placed between two cylindrical mandrels of a test machine, one of which is movable and is moved at a constant rate. The braking force F (in newtons) of the sample is measured and the tensile strength TS, defined by the ratio of the braking force F to the weight of the sample, is calculated.

The tensile strength is measured after manufacture (initial tensile strength denoted TSman) and after accelerated aging in an autoclave at a temperature of 105° C. under 100% relative humidity for 15 minutes (TS15);
the initial thickness of the insulating product and the thickness after having placed the product in a chamber heated at 70° C. under 95% relative humidity for 72 hours.

EXAMPLES 1 AND 2

Sizing compositions comprising the constituents appearing in table 1, in proportions expressed as parts by weight, are prepared.

The sizing compositions are prepared by simply mixing the constituents in water, with vigorous stirring until complete dissolution or dispersion of the constituents.

By way of reference, a first sizing composition is prepared in accordance with application WO 2013/021112 (Reference 1) and a second sizing composition which contains 67 parts by weight of a resin prepared in accordance with application WO 2008/043960, 20 parts by weight of urea and the additives mentioned in table 1 is prepared (Reference 2).

The sizing compositions are used to manufacture insulating products based on glass wool on an industrial line.

The mineral wool is produced continuously on a line with a width of 2.4 m by the internal centrifugation technique in which the molten glass composition is converted into fibers by means of a tool, referred to as centrifuging disk, comprising a basket forming a chamber for receiving the molten composition and a peripheral band pierced by a multitude of orifices: the disk is rotated about its vertically positioned axis of symmetry, the composition is ejected through the orifices under the effect of the centrifugal force and the material escaping from the orifices is drawn into fibers with the assistance of a drawing gas stream.

Conventionally, a size spraying ring is placed beneath the fiberizing disk so as to uniformly distribute the sizing composition over the glass wool which has just been formed.

The mineral wool thus sized is collected on a belt conveyor equipped with internal suction boxes which hold the mineral wool in the form of a felt or a web at the surface of the conveyor. The conveyor then runs continuously into an oven at 270° C., where the constituents of the size polymerize to form a binder.

The insulating product obtained at the outlet of the oven has a nominal density equal to 17.5 kg/m³ and a nominal thickness equal to 75 mm.

The properties of the insulating products appearing in table 1 are evaluated in comparison with products using the reference sizing compositions (References 1 and 2).

The presence of non-reducing sugar in examples 1 and 2 according to the invention makes it possible to limit the swelling compared with Reference 1.

The addition of ammonium sulfate (Example 2) improves the tensile strength after aging compared with References 1 and 2.

TABLE 1

| | Ex. 1 | Ex. 2 | Reference 1 | Reference 2 |
|---|---|---|---|---|
| Composition | | | | |
| Reducing saccharide[1] | — | — | 31.0 | — |
| Sucrose[2] | 24.0 | 24.0 | — | — |
| Hydrogenated saccharide[3] | 24.0 | 24.0 | 24.0 | — |
| Citric acid | 52.0 | 52.0 | 45.0 | — |
| Sodium hypophosphite | 5.0 | 5.0 | 5.0 | — |
| Mineral oil[4] | 8.0 | 8.0 | 8.0 | 9.5 |
| γ-Aminopropyltriethoxysilane | 0.5 | 0.5 | 0.5 | 0.5 |
| Silicone[5] | 2.1 | 2.1 | 2.1 | 2.1 |
| Ammonium sulfate | — | 5.0 | — | 3.0 |
| pH | 1.8[6] | 1.9[6] | 1.6[6] | 5.6[7] |
| Properties | | | | |
| Tensile strength (N/g) | | | | |
| Before aging | 3.62 | 3.23 | 3.85 | 3.58 |
| After aging | 2.80 | 3.29 | 3.12 | 3.11 |
| Loss (%) | 22.6 | 0 | 19.0 | 13.1 |
| Thickness (mm) | | | | |
| Before treatment | 81 | 83 | 83 | 83 |
| After treatment | 109 | 117 | 122 | 89 |
| Swelling (%) | 35.7 | 42.1 | 47.3 | 6.7 |
| Loss on ignition (%) | 5.2 | 5.2 | 5.2 | 4.7 |

[1]dextrin from corn starch; weight-average molar mass: 3510; polydispersity index PI: 5.2; dextrose equivalent DE: 30; sold under the reference Roclys ® C3072S by ROQUETTE FRERES
[2]granulated sugar No. 2 600 sold by TEREOS SYRAL
[3]maltitol syrup at 75% solids containing 55% of maltitol; sold under the reference Maltilite ® 5575 by SYRAL
[4]sold under the reference HydroWax ® 88 by SASOL
[5]sold under the reference DC1581 by DOW CORNING
[6]solids content of the sizing composition: 25%
[7]solids content of the sizing composition: 20%

The invention claimed is:
1. A sizing composition for insulating products, comprising:
at least two saccharides, wherein each saccharide present in the sizing composition is a non-reducing saccharide or a hydrogenated saccharide, and wherein at least one non-reducing saccharide and at least one hydrogenated saccharide are present in the sizing composition,
at least one polycarboxylic organic acid, wherein each of the at least one polycarboxylic organic acid present in the sizing composition is selected from the group consisting of oxalic acid, malonic acid, succinic acid, glutamic acid, adipic acid, pimelic acid, suberic acid, azelaic acid, sebacic acid, malic acid, tartaric acid, tartronic acid, aspartic acid, glutamic acid, fumaric acid, itaconic acid, maleic acid, traumatic acid, camphoric acid, phthalic acid and its derivatives, tetrahydrophthalic acid and its derivatives, isophthalic acid, terephthalic acid, mesoconic acid, citraconic acid, citric acid, tricarballylic acid, 1,2,4-butanetricarboxylic acid, aconitic acid, hemimellitic acid, trimellitic acid, trimesic acid, 1,2,3,4-butanetetracarboxylic acid and pyromellitic acid, and a catalyst selected from the group consisting of sodium hypophosphite, sodium phosphite and any mixture thereof.

2. The composition as claimed in claim 1, wherein the non-reducing saccharide is a non-reducing oligosaccharide containing at most 10 saccharide units.

3. The composition as claimed in claim 2, wherein the non-reducing saccharide is trehalose, an isotrehalose, sucrose, an isosucrose, melezitose, gentianose, raffinose, erlose, umbelliferose, stachyose or verbascose.

4. The composition as claimed in claim 1, wherein the hydrogenated saccharide is chosen from erythritol, arabitol, xylitol, sorbitol, mannitol, iditol, maltitol, isomaltitol, lactitol, cellobitol, palatinitol, maltotritol and the hydrogenation products of starch hydrolysates.

5. The composition as claimed in claim 4, wherein the hydrogenated saccharide is the hydrogenation product of a starch hydrolysate.

6. The composition as claimed in claim 4, wherein the hydrogenated saccharide has a number-average molar mass of less than 100 000.

7. The composition as claimed in claim 1, wherein the hydrogenated saccharide(s) represent(s) from 18% to 80% of the total weight of non-reducing saccharide(s) and hydrogenated saccharide(s).

8. The composition as claimed in claim 1, wherein the polycarboxylic organic acid is citric acid.

9. The composition as claimed in claim 1, wherein the non-reducing saccharide(s) and the hydrogenated saccharide(s) represent from 10% to 90% of the weight of the mixture consisting of the non-reducing saccharide(s), the hydrogenated saccharide(s) and the polycarboxylic organic acid(s).

10. The composition as claimed in claim 1, wherein the catalyst represents up to 20% of the total weight of the non-reducing saccharide(s), of the hydrogenated saccharide(s) and of polycarboxylic organic acid(s).

11. The composition as claimed in claim 1, further comprising the additives below in the following proportions calculated on the basis of 100 parts by weight of non-reducing saccharide(s), of hydrogenated saccharide(s) and of polycarboxylic organic acid(s):

0 to 2 parts of silane,
0 to 40 parts of oil,
0 to 30 parts of urea,
0 to 5 parts of a silicone,
0 to 20 parts of a polyol other than the abovementioned saccharides,
0 to 15 parts of metal sulfate or ammonium sulfate, and
0 to 30 parts of an extender chosen from lignin derivatives and animal or plant proteins.

12. An acoustic and/or thermal insulating product based on mineral wool sized using the sizing composition as claimed in claim 1.

13. A net of mineral fibers sized using the sizing composition as claimed in claim 1.

14. The composition as claimed in claim 1, wherein the insulating products are based on mineral wool including rock or glass.

15. The composition as claimed in claim 3, wherein the non-reducing saccharide is sucrose or trehalose.

16. The composition as claimed in claim 15, wherein the non-reducing saccharide is sucrose.

17. The composition as claimed in claim 5, wherein the hydrogenated saccharide is a maltitol syrup.

18. The composition as claimed in claim 6, wherein the hydrogenated saccharide has a number-average molar mass of less than 50 000.

19. The composition as claimed in claim 18, wherein the hydrogenated saccharide has a number-average molar mass of less than 5000.

20. The composition as claimed in claim 19, wherein the hydrogenated saccharide has a number-average molar mass of less than 1000.

21. The composition as claimed in claim 6, wherein the hydrogenated saccharide has a number-average molar mass greater than 100.

22. The composition as claimed in claim 7, wherein the hydrogenated saccharide(s) represent(s) from 30% to 70% of the total weight of non-reducing saccharide(s) and hydrogenated saccharide(s).

23. The composition as claimed in claim 22, wherein the hydrogenated saccharide(s) represent(s) from 40% to 60% of the total weight of non-reducing saccharide(s) and hydrogenated saccharide(s).

24. The composition as claimed in claim 9, wherein the non-reducing saccharide(s) and the hydrogenated saccharide(s) represent from 20% to 85% of the weight of the mixture consisting of the non-reducing saccharide(s), the hydrogenated saccharide(s) and the polycarboxylic organic acid(s).

25. The composition as claimed in claim 24, wherein the non-reducing saccharide(s) and the hydrogenated saccharide(s) represent from 30% to 80% of the weight of the mixture consisting of the non-reducing saccharide(s), the hydrogenated saccharide(s) and the polycarboxylic organic acid(s).

26. The composition as claimed in claim 25, wherein the non-reducing saccharide(s) and the hydrogenated saccharide(s) represent from 40% to 65% of the weight of the mixture consisting of the non-reducing saccharide(s), the hydrogenated saccharide(s) and the polycarboxylic organic acid(s).

27. The composition as claimed in claim 26, wherein the non-reducing saccharide(s) and the hydrogenated saccharide(s) represent from 45% to 65% of the weight of the mixture consisting of the non-reducing saccharide(s), the hydrogenated saccharide(s) and the polycarboxylic organic acid(s).

28. The composition as claimed in claim 10, wherein the catalyst represents up to 10% of the total weight of the non-reducing saccharide(s), of the hydrogenated saccharide(s) and of polycarboxylic organic acid(s).

29. The composition as claimed in claim 10, wherein the catalyst represents at least 1% of the total weight of the non-reducing saccharide(s), of the hydrogenated saccharide(s) and of polycarboxylic organic acid(s).

30. The composition as claimed in claim 11, wherein the silane is an aminosilane or an epoxy silane.

31. The composition as claimed in claim 11, comprising 0 to 30 parts of oil.

32. The composition as claimed in claim 31, comprising 4 to 24 parts of oil.

33. The composition as claimed in claim 11, comprising 0 to 20 parts of urea.

34. The composition as claimed in claim 33, wherein the composition is devoid of urea.

35. The composition as claimed in claim 11, comprising 0 to 10 parts of metal sulfate or ammonium sulfate.

36. The composition as claimed in claim 35, comprising 0 to 5 parts of metal sulfate or ammonium sulfate.

37. The composition as claimed in claim 11, wherein the lignin derivatives are ammonium lignosulfonate or sodium lignosulfonate.

38. The composition as claimed in claim 1, wherein each saccharide present in the sizing composition is the at least one non-reducing saccharide or the at least one hydrogenated saccharide.

39. A sizing composition for insulating products, comprising:
- at least two saccharides, wherein each saccharide present in the sizing composition is a non-reducing saccharide, or a hydrogenated saccharide, and wherein at least one non-reducing saccharide and at least one hydrogenated saccharide are present in the sizing composition,
- citric acid, wherein citric acid is the only polycarboxylic organic acid present in the sizing composition, and
- a catalyst selected from the group consisting of sodium hypophosphite, sodium phosphite and any mixture thereof.

40. A sizing composition for insulating products, consisting of:
- at least one non-reducing saccharide,
- at least one hydrogenated saccharide,
- at least one polycarboxylic organic acid, wherein each of the at least one polycarboxylic organic acid present in the sizing composition is selected from the group consisting of oxalic acid, malonic acid, succinic acid, glutamic acid, adipic acid, pimelic acid, suberic acid, azelaic acid, sebacic acid, malic acid, tartaric acid, tartronic acid, aspartic acid, glutamic acid, fumaric acid, itaconic acid, maleic acid, traumatic acid, camphoric acid, phthalic acid and its derivatives, tetrahydrophthalic acid and its derivatives, isophthalic acid, terephthalic acid, mesoconic acid, citraconic acid, citric acid, tricarballylic acid, 1,2,4-butanetricarboxylic acid, aconitic acid, hemimellitic acid, trimellitic acid, trimesic acid, 1,2,3,4-butanetetracarboxylic acid and pyromellitic acid,
- one or more of additives below in the following proportions calculated on the basis of 100 parts by weight of the at least one non-reducing saccharide, of the at least one hydrogenated saccharide and of the at least one polycarboxylic organic acid:
  - 0 to 2 parts of silane,
  - 0 to 40 parts of oil,
  - 0 to 30 parts of urea,
  - 0 to 5 parts of a silicone,
  - 0 to 20 parts of a polyol other than the abovementioned saccharides,
  - 0 to 15 parts of metal sulfate or ammonium sulfate, and
  - 0 to 30 parts of an extender chosen from lignin derivatives and animal or plant proteins, and
- a catalyst chosen from Lewis bases and acids, phosphorus-containing compounds and compounds containing fluorine and boron.

41. The composition as claimed in claim 40, wherein the at least one non-reducing saccharide and the at least one hydrogenated saccharide represent from 45% to 65% of the weight of the mixture consisting of the at least one non-reducing saccharide, the at least one hydrogenated saccharide and the citric acid.

* * * * *